(12) United States Patent
Eilers et al.

(10) Patent No.: US 10,663,083 B2
(45) Date of Patent: May 26, 2020

(54) TRIM ASSEMBLY HAVING A SIDE BRANCH RESONATOR ARRAY AND FLUID CONTROL VALVE COMPRISING SAME

(71) Applicant: FISHER CONTROLS INTERNATIONAL LLC, Marshalltown, IA (US)

(72) Inventors: Daniel J. Eilers, Marshalltown, IA (US); Allen C. Fagerlund, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 138 days.

(21) Appl. No.: 15/788,103

(22) Filed: Oct. 19, 2017

(65) Prior Publication Data

US 2018/0112799 A1    Apr. 26, 2018

Related U.S. Application Data

(60) Provisional application No. 62/411,201, filed on Oct. 21, 2016.

(51) Int. Cl.
*F16K 47/08* (2006.01)
*F16K 1/54* (2006.01)
*F16K 3/24* (2006.01)

(52) U.S. Cl.
CPC .............. *F16K 47/08* (2013.01); *F16K 1/54* (2013.01); *F16K 3/246* (2013.01)

(58) Field of Classification Search
None
See application file for complete search history.

(56) References Cited

U.S. PATENT DOCUMENTS

| 5,457,291 | A  | * | 10/1995 | Richardson | ......... B28B 23/0068 |
|           |    |   |         |            | 181/293 |
| 7,069,950 | B1 | * | 7/2006 | Bittner | ..................... F16K 47/08 |
|           |    |   |         |         | 137/625.37 |
| 8,042,989 | B2 | * | 10/2011 | Gordon | .................. B01F 5/0268 |
|           |    |   |         |        | 138/40 |
| 8,356,622 | B2 |   | 1/2013 | Wears | |

(Continued)

FOREIGN PATENT DOCUMENTS

| EP | 1869355 A1 | 12/2007 |
| GB | 1223983 A  | 3/1971 |

OTHER PUBLICATIONS

Search Report for International application No. PCT/US2017/057596, dated Jan. 30, 2018.

(Continued)

*Primary Examiner* — John Fox
(74) *Attorney, Agent, or Firm* — Marshall, Gerstein & Borun LLP

(57) ABSTRACT

A fluid valve includes a valve body having a fluid inlet and a fluid outlet. A fluid passageway connects the fluid inlet and the fluid outlet. A trim assembly is located within the fluid passageway and the trim assembly cooperates with a control member to control fluid flow through the fluid passageway. The trim assembly includes a cage and a cage retainer. The cage retainer is located downstream of the cage and the cage retainer and the cage are aligned longitudinally within the fluid passageway. The cage retainer includes a side branch resonator array.

14 Claims, 3 Drawing Sheets

(56) References Cited

U.S. PATENT DOCUMENTS

| | | | | |
|---|---|---|---|---|
| 2003/0136454 A1* | 7/2003 | Thurston | ............... | F16K 47/08 |
| | | | | 138/42 |
| 2004/0146396 A1* | 7/2004 | Liu | ............... | F04D 29/665 |
| | | | | 415/119 |
| 2008/0296431 A1* | 12/2008 | Ivers | ............... | B64D 33/02 |
| | | | | 244/1 N |
| 2009/0151215 A1* | 6/2009 | Saur | ............... | F41A 9/60 |
| | | | | 42/98 |
| 2011/0100490 A1* | 5/2011 | Haines | ............... | F16K 47/08 |
| | | | | 137/599.01 |
| 2016/0203812 A1* | 7/2016 | Wilson | ............... | G10K 11/172 |
| | | | | 181/293 |
| 2018/0328517 A1* | 11/2018 | Zhou | ............... | F16K 47/08 |

OTHER PUBLICATIONS

Written Opinion for International application No. PCT/US2017/057596, dated Jan. 30, 2018.

\* cited by examiner

TRIM ASSEMBLY HAVING A SIDE BRANCH RESONATOR ARRAY AND FLUID CONTROL VALVE COMPRISING SAME

FIELD OF THE DISCLOSURE

The disclosure relates generally to fluid valves and, more particularly, to trim assemblies that include a side branch resonator array for use in a fluid control valve.

BACKGROUND

Control valves are commonly used in process plants to control the flow of a fluid (e.g., a gas, a liquid, etc.) or any other substance through pipes and/or vessels to which they are connected. A control valve is typically composed of one or more inlets and outlets, and includes a fluid control element or member (e.g., a valve gate, a piston, a valve plug, a control member, etc.) that operates to control fluid flow through apertures that fluidly couple the inlet(s) to the outlet(s). A control member is typically coupled to a valve bonnet that is mechanically coupled (e.g., bolted, clamped, threaded into, etc.) to the valve body. Typically, the control member is configured to engage a sealing structure (e.g., a valve seat) that encompasses a flow path through the valve.

Generally speaking the control elements (including the fluid control member, the seat, and a cage if one exists) are known as "valve trim" or "trim assembly" in the art. In some cases it may be desirable to characterize fluid as it flows through the valve, for example, to reduce pressure. In these cases, a trim assembly may be used that includes a cage with a plurality of openings that are drilled through a wall of the cage. The openings may be sized and shaped to characterize fluid flow as the fluid flows through the openings in the cage, for example by decreasing pressure as the fluid moves through the valve trim. This characterization or pressure reducing process generates unwanted noise.

SUMMARY

In accordance with a first exemplary aspect, a fluid valve includes a valve body having a fluid inlet and a fluid outlet. A fluid passageway connects the fluid inlet and the fluid outlet. A trim assembly is located within the fluid passageway and the trim assembly cooperates with a control member to control fluid flow through the fluid passageway. The trim assembly includes a cage and a cage retainer. The cage retainer is located downstream of the cage and the cage retainer and the cage are aligned longitudinally within the fluid passageway. The cage retainer includes a side branch resonator array.

In accordance with a second exemplary aspect, a trim assembly for a fluid control valve includes a cage and a cage retainer. The cage retainer is located downstream of the cage. The cage retainer and the cage are aligned longitudinally within the fluid passageway. The cage retainer includes a side branch resonator array.

In accordance with a third exemplary aspect, a cage retainer for a fluid control valve includes a side branch resonator array located in a side wall of the cage retainer. The side branch resonator array includes a plurality of chambers, each chamber in the plurality of chambers including an opening on the downstream side of the side wall.

In further accordance with any one or more of the foregoing first, second, or third aspects, a fluid valve, a trim assembly, or a cage retainer may further include any one or more of the following preferred forms.

In one preferred form, the side branch resonator array includes a plurality of cavities located in a side wall of the cage retainer.

In another preferred form, at least one cavity in the plurality of cavities includes an opening that is oriented on a downstream side of the side wall.

In yet another preferred form, at least one cavity in the plurality of cavities includes a spherical chamber.

In yet another preferred form, the at least one cavity includes a cylindrical-shaped neck that fluidly connects the spherical chamber to the opening.

In yet another preferred form, the at least one cavity has the form of a Helmholz resonator or of a pyramidal chamber.

In yet another preferred form, the at least one cavity includes a square cylinder-shaped neck that fluidly connects the pyramidal chamber to the opening.

In yet another preferred form, the side branch resonator array includes a plurality of channels formed in a side wall of the cage retainer, at least one of the channels including an opening on a downstream side of the side wall.

In yet another preferred form, the at least one channel includes at least one directional change within the side wall.

In yet another preferred form, the side branch resonator array includes an internal chamber formed in a side wall of the cage retainer, the internal chamber including a plurality of openings located on a downstream side of the side wall.

In yet another preferred form, the cage is a pressure reducing cage.

In yet another preferred form, the pressure reducing cage includes a plurality of through bores, each of the through bores extending completely through a cage wall of the cage.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The examples described herein relate to fluid valves having a trim assembly that includes a side branch resonator array. Such side branch resonator arrays allow the trim assembly to absorb or attenuate noise generated by pressure reducing elements of the trim assembly. The examples described herein substantially reduce the amount of noise generated by the pressure reducing member of the trim assembly, which extends the useful life of valve components. The resonator arrays may be tuned to absorb specific problematic frequencies of noise. Such an approach may reduce the size of the array and thus the cost of manufacturing the array. Generally, the described examples may be manufactured using additive manufacturing or 3D printing techniques.

Figure 1:
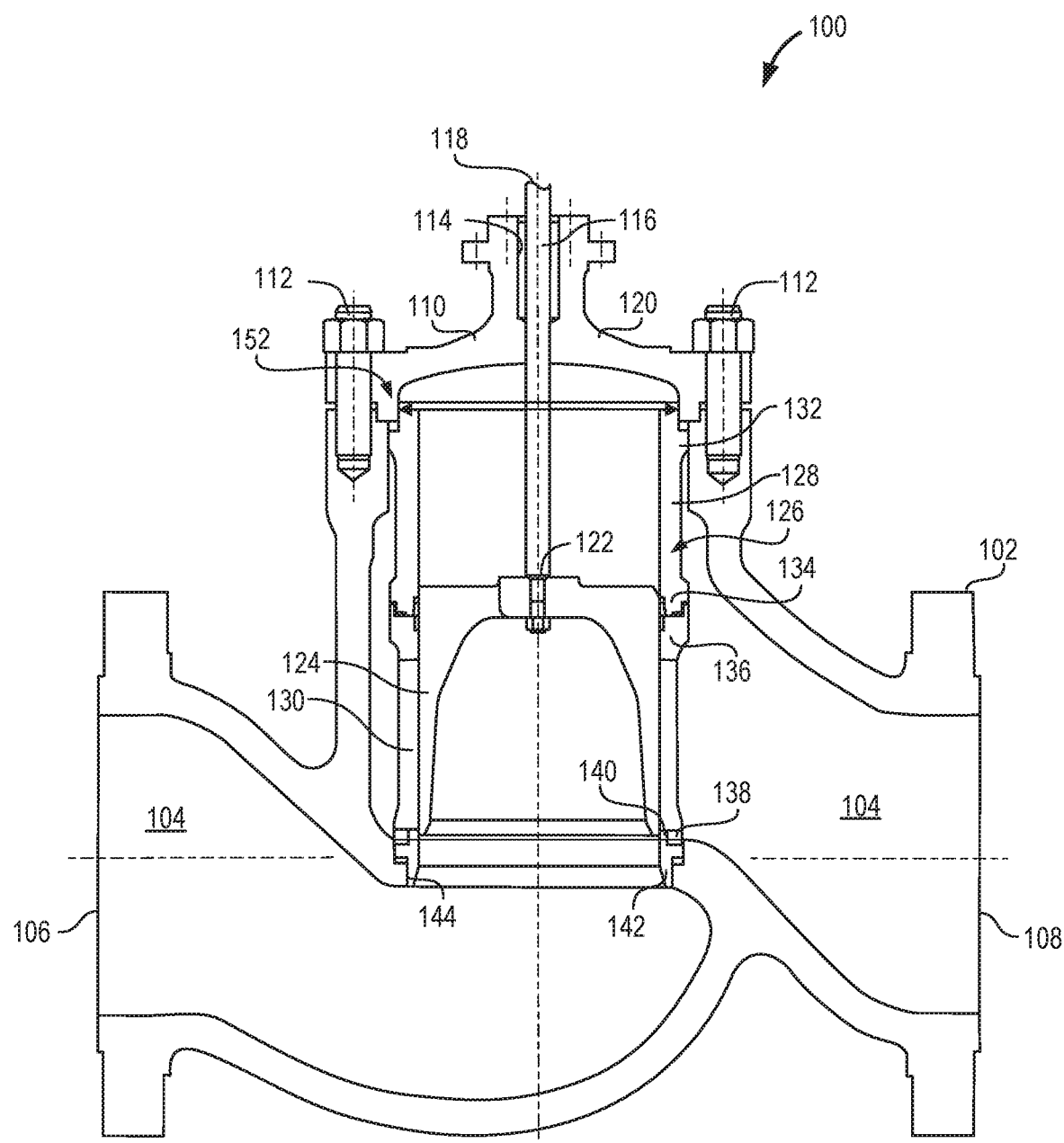
FIG. 1 illustrates a cross-sectional view of a fluid control valve constructed in accordance with the teachings of the disclosure.

FIG. 1 illustrates an example fluid valve 100 that has a valve body 102 including a fluid flow passageway 104 between an inlet 106 and an outlet 108. A bonnet 110 is coupled to the valve body 102 via a plurality of fasteners 112 and includes a bore 114 to receive a stem 116. An end 118 of the stem 116 extends from a bonnet body 120 and is operatively coupled to an actuator (not shown), and an opposite end 122 of the stem 116 is coupled to a control member 124 (e.g., a valve plug).

As used herein, a valve trim assembly 126 of the example fluid valve 100 includes a cage retainer 128 (e.g., an upper cage retainer or guide), a cage 130, and a seat 142. In the embodiments illustrated in the figures, the cage retainer 128 and the cage 130 are illustrated as separate and distinct structural elements. In other embodiments, the cage 130 and the cage retainer 128 may be formed as a single unitary structural element. In such an embodiment, the features described below with respect to the cage retainer 128 are located downstream of the features described below with respect to the cage 130.

Generally, an end 132 of the cage retainer 128 is positioned at least partially within the valve body 102 and adjacent the bonnet 110 and an opposing end 134 of the cage retainer 128 engages an end 136 of the cage 130 such that the cage retainer 128 and the cage 130 are coaxially aligned. The cage 130 is positioned within the valve body 102 such that opposing steps or shoulders 138 and 140 of the cage 130 and the seat 142 (e.g., a seat ring) engage and/or interlock to secure the seat 142 at least partially within an aperture 144 of the valve body 102. Such an approach eliminates the need for a plurality of fasteners to secure the seat 142 relative to the valve body 102 and, thus, the distortion caused, in some instances, when coupling a seat ring to a valve body. Additionally, by eliminating the need for a plurality of fasteners to secure the seat 142, the seat 142 may be more easily removed from and/or assembled within the example fluid valve 100 during, for example, routine maintenance.

In one example, the cage retainer 128, the seat 142, the valve body 102 and/or any other valve components, may include a dynamic joint 152. In other embodiments, the dynamic joint 152 may be eliminated and the cage retainer 128 may be directly coupled to the bonnet 110. Where the dynamic joint 152 is included, it allows the cage 130 and the cage retainer 128 to expand/contract (e.g., in response to thermal cycles) while enabling the cage 130 to remain in contact with the seat 142 to maintain the seat 142 in sealing engagement with the aperture 144.

Figure 2:
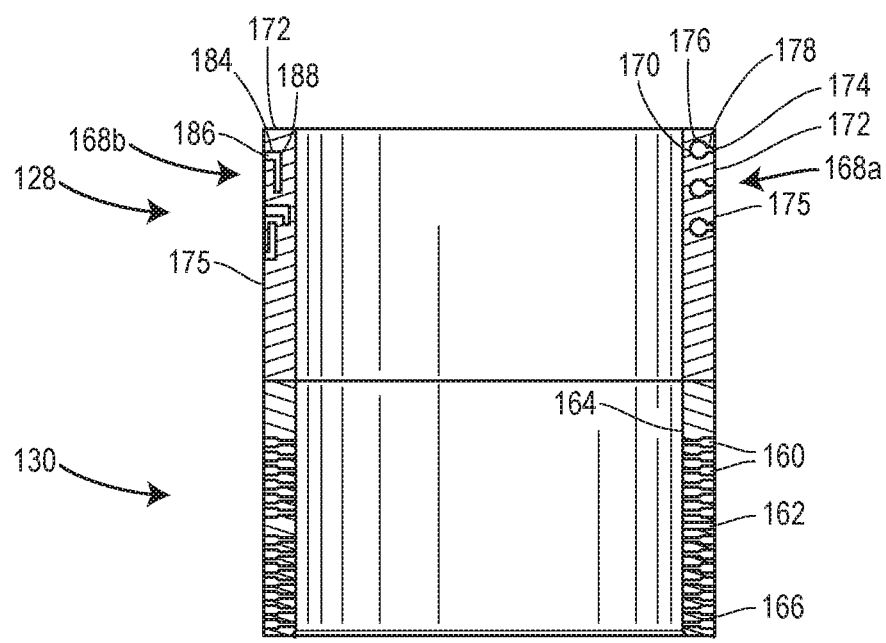
FIG. 2 illustrates a cross-sectional view of a trim assembly of the fluid control valve of FIG. 1.
Figure 3:
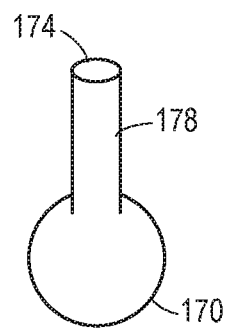
FIG. 3 illustrates one embodiment of a cavity that is located in the cage retainer of the trim assembly of FIG. 2.
Figure 4:
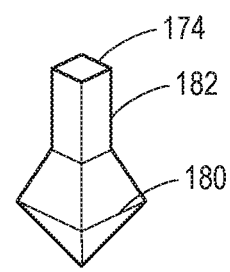
FIG. 4 illustrates a second embodiment of a cavity that is located in the cage retainer of the trim assembly of FIG. 2.

Turning now to FIGS. 2-4, the trim assembly 126 cooperates with the control member 124 to control fluid flow through the fluid passageway 104, the trim assembly 126 includes the cage 130 and the cage retainer 128. In some embodiments, the trim assembly 126 may also include the seat 142. The cage retainer 128 is located downstream of the cage 130 and the cage retainer 128 and the cage 130 are aligned longitudinally within the fluid passageway 104. In some embodiments, the cage 130 may be a pressure reducing cage. In such embodiments, the cage 130 includes a plurality of pressure reducing through-bores 160, which extend completely through a wall 162 of the cage 130 from an interior (or upstream) surface 164 to an exterior (or downstream) surface 166. The cage retainer 128 includes a side branch resonator array 168a, 168b. For the purposes of illustration, two different side branch resonator arrays 168a, 168b are illustrated in FIG. 2. In some embodiments, the side branch resonator array 168a, 168b may include similar elements around the entire cage retainer 128. In other embodiments, elements from any side branch resonator array described herein may be combined in a single cage retainer 128.

On the right side of FIG. 2, the side branch resonator array 168a includes a plurality of cavities 170 located in a side wall 172 of the cage retainer 128. At least one cavity in the plurality of cavities 170 includes an opening 174 that is oriented on the exterior (or downstream) side 175 of the side wall 172.

The at least one cavity in the plurality of cavities 170 includes a spherical chamber 176. The at least one cavity in the plurality of cavities 170 also includes a cylindrical-shaped neck 178 that fluidly connects the spherical chamber 176 to the opening 174. Generally, the at least one cavity in the plurality of cavities 170 may have the form of a Helmholz resonator (FIG. 3).

In other embodiments, for example in FIG. 4, the at least one cavity in the plurality of cavities 170 may include a pyramidal chamber 180. The at least one cavity in the plurality of cavities 170 may include a square cylinder-shaped neck 182 that fluidly connects the pyramidal chamber 180 to the opening 174.

In other embodiments, the side branch resonator array 168b (left side of FIG. 2) includes a plurality of quarter tubes or channels 184 formed in the side wall 172 of the cage retainer 128. At least one of the channels in the plurality of channels 184 includes an opening 186 on the exterior (or downstream) side 175 of the side wall 172. In some embodiments, the at least one channel in the plurality of channels 184 includes at least one turn 188 or directional change within the side wall 172. While the channels in the plurality of channels 184 are illustrated as having linear segments, in other embodiments, the channels may have curved or rounded segments. In yet other embodiments, the channels may have more than one branch.

Figure 5:
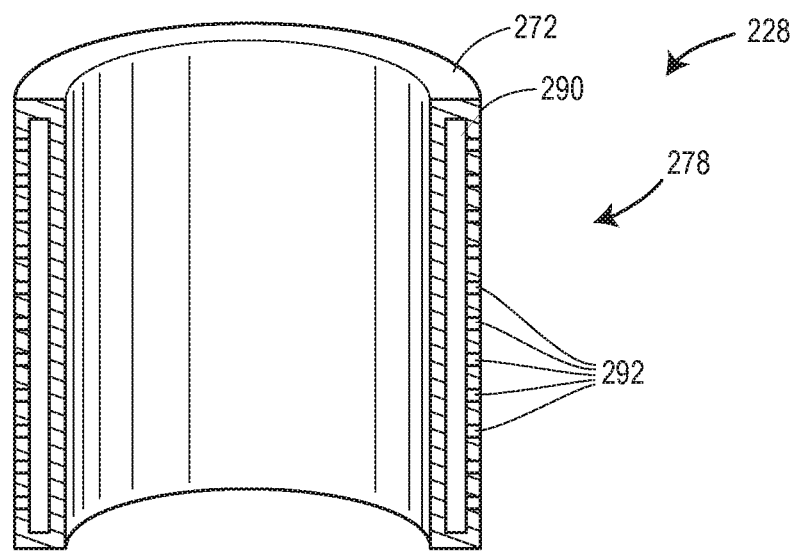
FIG. 5 illustrates an alternate embodiment of a cage retainer of the trim assembly of FIG. 2.

Turning now to FIG. 5, an alternate embodiment of a cage retainer 228 is illustrated. In the embodiment of FIG. 5, the cage retainer 228 includes a side branch resonator array 278 that includes an internal chamber 290 formed in the side wall 272 of the cage retainer 228. The internal chamber 290 includes a plurality of perforations or openings 292 located on the exterior (or downstream) side of the side wall 272. While the internal chamber 290 is illustrated as a single, continuous chamber, in other embodiments, the internal chamber 290 can be sub-divided into a plurality of sub-chambers.

Generally, the side branch resonator arrays described herein include cavities, channels, or chambers within a side wall of the cage retainer. The cavities, channels, or chambers are fluidly connected only to the downstream side of the cage retainer. The cavities, channels, or chambers reduce the amplitude of the vibratory motion of the fluid flowing through the valve by taking energy from sound waves passing in the surrounding fluid. The cavities, channels, or chambers reduce undesirable sound frequencies by being tuned to the problem frequency. Because the cavities, channels, or chambers are tuned to the problem frequency, they remove the energy of this frequency from the surrounding fluid, thereby eliminating or reducing the problem frequency.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A fluid control valve comprising:
a valve body having a fluid inlet and a fluid outlet;
a fluid passageway connecting the fluid inlet and the fluid outlet;
a control member movably disposed in the valve body;
a trim assembly located within the fluid passageway, the trim assembly cooperating with the control member to control fluid flow through the fluid passageway, the trim assembly including a cage and a cage retainer, the cage retainer being located downstream of the cage, the cage retainer and the cage being aligned longitudinally within the fluid passageway,
wherein the cage retainer includes a side branch resonator array.

2. The fluid control valve of claim 1, wherein the side branch resonator array comprises a plurality of cavities located in a side wall of the cage retainer.

3. The fluid control valve of claim 2, wherein at least one cavity in the plurality of cavities includes an opening that is oriented on the downstream side of the side wall.

4. The fluid control valve of claim 3, wherein at least one cavity in the plurality of cavities includes a spherical chamber.

5. The fluid control valve of claim 4, wherein the at least one cavity includes a cylindrical-shaped neck that fluidly connects the spherical chamber to the opening.

6. The fluid control valve of claim 5, wherein the at least one cavity has the form of a Helmholz resonator.

7. The fluid control valve of claim 3, wherein at least one cavity in the plurality of cavities includes a pyramidal chamber.

8. The fluid control valve of claim 7, wherein the at least one cavity includes a square cylindrical-shaped neck that fluidly connects the pyramidal chamber to the opening.

9. The fluid control valve of claim 1, wherein the side branch resonator array includes a plurality of channels formed in a side wall of the cage retainer, at least one of the channels including an opening on a downstream side of the side wall.

10. The fluid control valve of claim 9, wherein the at least one channel includes at least one directional change within the side wall.

11. The fluid control valve of claim 1, wherein the side branch resonator array includes an internal chamber formed in a side wall of the cage retainer, the internal chamber including a plurality of openings located on a downstream side of the side wall.

12. The fluid control valve of claim 1, wherein the cage is a pressure reducing cage.

13. The fluid control valve of claim 12, wherein the pressure reducing cage includes a plurality of through bores, each of the through bores extending completely through a cage wall of the cage.

14. The fluid control valve of claim 1, wherein the trim assembly further comprises a valve seat, wherein the cage has an end that directly engages the valve seat to secure the valve seat within the valve body.

* * * * *

UNITED STATES PATENT AND TRADEMARK OFFICE
CERTIFICATE OF CORRECTION

PATENT NO. : 10,663,083 B2
APPLICATION NO. : 15/788103
DATED : May 26, 2020
INVENTOR(S) : Daniel J. Eilers et al.

Page 1 of 1

It is certified that error appears in the above-identified patent and that said Letters Patent is hereby corrected as shown below:

In the Specification

At Column 2, Line 13, "Helmholz resonator." should be -- Helmholtz resonator. --.

At Column 2, Line 37, "disclosure;" should be -- disclosure. --.

At Column 4, Line 21, "Helmholz resonator." should be -- Helmholtz resonator. --.

In the Claims

At Column 6, Line 2, "Helmholz resonator." should be -- Helmholtz resonator. --.

Signed and Sealed this
Second Day of March, 2021

Drew Hirshfeld
*Performing the Functions and Duties of the
Under Secretary of Commerce for Intellectual Property and
Director of the United States Patent and Trademark Office*